(12) United States Patent
Al-Salameh et al.

(10) Patent No.: US 6,414,771 B2
(45) Date of Patent: *Jul. 2, 2002

(54) OPTICAL TRANSMISSION SYSTEM INCLUDING OPTICAL RESTORATION

(75) Inventors: Daniel Y Al-Salameh, Marlboro; William J. Gartner, Middletown, both of NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,233

(22) Filed: Apr. 27, 1998

(51) Int. Cl.[7] .................................................. H04J 14/02
(52) U.S. Cl. ..................... 359/128; 359/110; 359/117; 359/118; 359/119; 359/161; 370/222; 370/223; 370/224
(58) Field of Search .............................. 359/110, 117, 359/119, 161, 128, 127; 370/222, 223, 224

(56) References Cited

U.S. PATENT DOCUMENTS

| | | | | |
|---|---|---|---|---|
| 5,442,620 A | | 8/1995 | Kremer ..................... 370/16.1 |
| 5,625,478 A | | 4/1997 | Doerr et al. ................ 359/125 |
| 5,745,476 A | * | 4/1998 | Chaudhuri ................. 370/222 |
| 5,986,783 A | * | 11/1999 | Sharma et al. ............. 359/119 |
| 6,046,833 A | * | 4/2000 | Sharma et al. ............. 359/119 |
| 6,086,141 A | * | 7/2000 | Merli et al. ................. 359/110 |

OTHER PUBLICATIONS

Daniel Y. Al–Salameh et al. "Optical Networking", Bell Labs Technical Jounal, vol. 3, No. 1, pp. 39–61, Jan.–Mar. 1998.

* cited by examiner

Primary Examiner—Leslie Pascal
Assistant Examiner—Chau M. Nguyen

(57) ABSTRACT

An optical communications system employs a plurality of optical nodes interconnected in a ring configuration by at least two optical transmission media, for example, optical fiber. The at least two optical transmission media, in this example, provide optical service transmission capacity and optical protection transmission capacity. Efficient restoration of optical communications between optical nodes in the ring, after an optical transmission media failure, is realized by employing a relatively simple and efficient optical switch matrix having a first number of possible switching states and, then, by utilizing only a second number of the switching states fewer than the first number to switch optically from the optical service transmission capacity of the failed or faulted optical transmission media to the optical protection transmission capacity of another optical transmission media. Optical switching states of the optical switch matrix are blocked that are not actively used for switching from the active optical service capacity of the faulted optical transmission media to the standby optical protection capacity of the other optical transmission media. Use of this relatively simple optical switch matrix allows for the bulk switching of the optical wavelengths as contrasted with the one-to-one switching of the optical wavelengths used in prior arrangements.

31 Claims, 16 Drawing Sheets

| IN/OUT | A | B | C | D | E | F | G | H |
|---|---|---|---|---|---|---|---|---|
| I |   |   |   |   |   | • |   | • |
| J |   |   |   |   | • |   | • |   |
| K |   |   |   | ⊠ |   |   |   |   |
| L |   | • |   |   |   |   | • |   |
| M |   |   | • |   |   | • |   |   |
| N | ⊠ |   |   |   |   |   |   |   |

| IN/OUT | A | B | C | D | E | F | G | H |
|---|---|---|---|---|---|---|---|---|
| I |   |   |   |   |   | ● |   | ⊠ |
| J |   |   |   |   | ● |   | ⊠ |   |
| K |   |   |   | ⊠ |   |   |   |   |
| L |   | ● |   |   |   |   | ● |   |
| M |   |   | ⊠ |   |   | ● |   |   |
| N | ⊠ |   |   |   |   |   |   |   |

*FIG. 11*

| IN / OUT | A | B | C | D | E | F | G | H |
|---|---|---|---|---|---|---|---|---|
| I |   |   |   |   |   | ⊠ |   | • |
| J |   |   |   |   | ⊠ |   | • |   |
| K |   |   |   | ⊠ |   |   |   |   |
| L |   | ⊠ |   |   |   |   | • |   |
| M |   |   | • |   |   | • |   |   |
| N | ⊠ |   |   |   |   |   |   |   |

…

OPTICAL TRANSMISSION SYSTEM INCLUDING OPTICAL RESTORATION

TECHNICAL FIELD

This invention relates to restoration of transmission systems and, more particularly, to restoration of optical transmission systems.

BACKGROUND OF THE INVENTION

Optical transmission systems and, especially, those employing Dense Wavelength Division Multiplexing (DWDM) are desirable because they provide extremely wide bandwidths for communications channels. Each communications channel in the DWDM transmission system carries a plurality, for example, 16, 40 or even 80, optical channels (wavelengths) on a single optical fiber and single optical repeater. However, there is a trade off between providing wider bandwidth communications channels, with their corresponding lower cost of transport, and their vulnerability to large-scale disruption of communications services because of transmission medium failure. Therefore, the ability of an optical transmission system, for example, those employing DWDM, to restore itself after a transmission medium failure is very important because of its wider impact on communications services. The DWDM optical transmission systems are of particular interest because of their restoration capabilities.

Prior attempts at providing adequate restoration in optical transmission systems have focused on so-called 1+1 optical protection switching and on optical cross connect systems. The 1+1 optical protection switching is limited in its application and does not efficiently use optical fiber. Known optical cross connect systems, require the use of a relatively large optical switching fabric to accommodate the capacity of the optical transmission system. Unfortunately, current technology may not support providing such a large switching fabric having an acceptable optical performance level. Moreover, use of such a large switching fabric in the optical cross connect comes with a relatively high cost. Furthermore, the optical cross connect system will be slower in terms of restoration speed than provided by prior known SONET/SDH ring transmission systems. In order to protect all wavelengths used in the optical transmission system the prior arrangements had to switch one wavelength at a time. Such switching is very inefficient.

SUMMARY OF THE INVENTION

These problems and other limitations of prior known optical restoration systems are overcome in an optical communications system that employs a plurality of optical nodes interconnected in an optical ring transmission configuration by at least two optical transmission media, for example, optical fiber. The at least two optical transmission media, in this example, provide optical service transmission capacity and optical protection transmission capacity. Efficient restoration of optical communications between optical nodes in the ring, after an optical transmission media failure, is realized by employing a relatively simple and efficient optical switch matrix having a first number of possible switching states and, then, by utilizing only a second number of the switching states fewer than the first number to switch optically from the optical service transmission capacity of the failed or faulted optical transmission media to the optical protection transmission capacity of another optical transmission media. Optical switching states of the optical switch matrix are blocked that are not actively used for switching from the active optical service capacity of the faulted optical transmission media to the standby optical protection capacity of the other optical transmission media. Use of this relatively simple optical switch matrix allows for the bulk switching of the optical wavelengths as contrasted with the one-to-one switching of the optical wavelengths used in prior arrangements.

In a preferred embodiment of the invention, each of the at least two optical transmission media provides both bi-directional optical service transmission capacity and bi-directional optical protection transmission capacity. In a specific embodiment of the invention, each optical transmission channel (wavelength) includes 50 percent bi-directional optical service transmission capacity and 50 percent bi-directional optical protection transmission capacity.

In another embodiment of the invention, one of the at least two optical transmission media provides active optical service transmission capacity and another of the optical transmission media provides standby optical protection transmission capacity.

In still another embodiment of the invention, at least four optical transmission media (optical fiber) are utilized to provide transmit and receive active optical service transmission capacity and transmit and receive standby optical protection transmission capacity. Specifically, one pair of the optical transmission media is used to provide bi-directional transmit and receive active optical service transmission capacity and another pair of the optical transmission media is used to provide the bi-directional transmit and receive standby optical protection transmission capacity.

BRIEF DESCRIPTION OF THE DRAWING

FIG. 3 illustrates, in simplified block diagram form, details of another version of an optical node that can be used in the system of FIG. 1 and including an embodiment of the invention;

FIG. 6 is a state diagram showing the allowable optical switching states of the optical switching matrix of FIG. 5 for both terminal optical nodes and intermediate pass through optical nodes;

FIG. 9 is a state diagram showing the optical switch states for effecting the optical protection switch in the optical node of FIG. 8;

FIG. 11 is a state diagram showing the optical switch states for effecting the optical protection switch in the optical node of FIG. 10;

DETAILED DESCRIPTION

Figure 1:
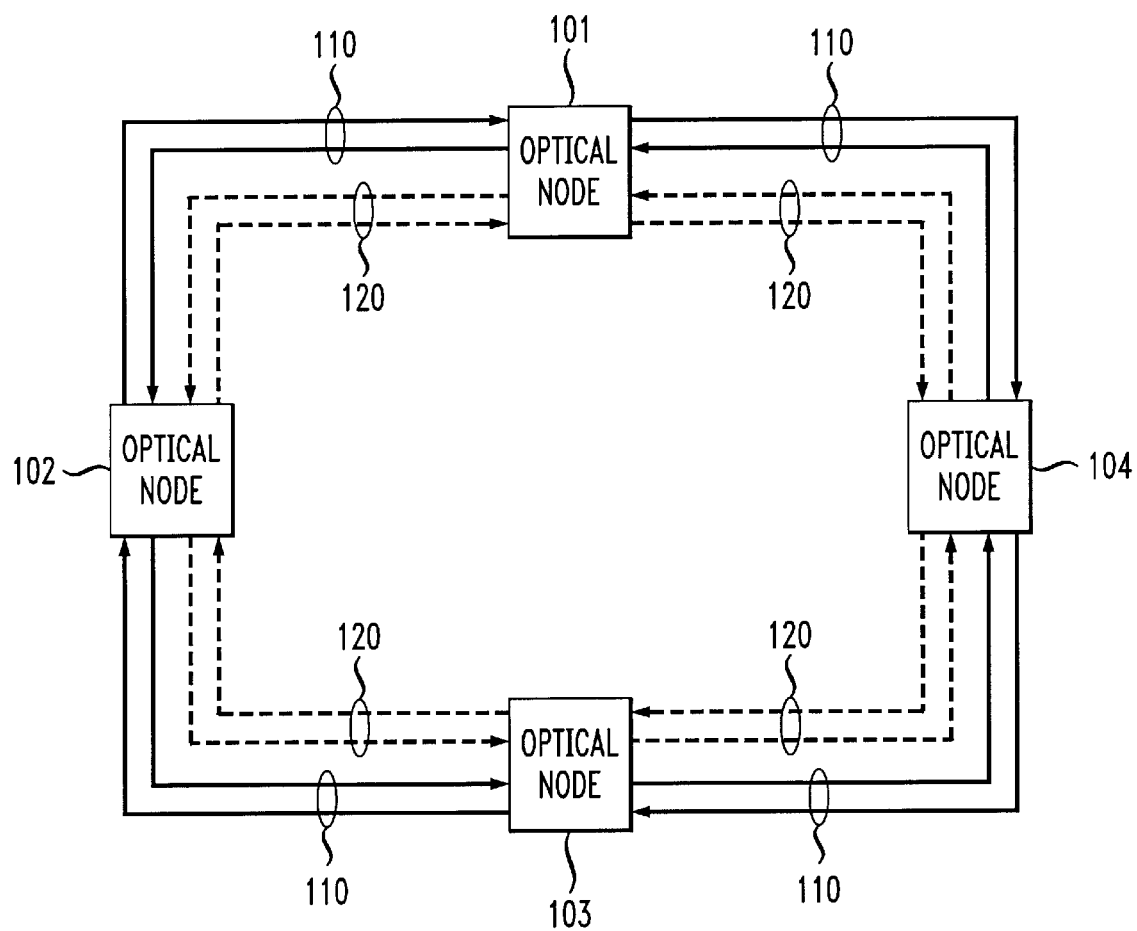
FIG. 1 illustrates, in simplified block form, details of an optical ring transmission system.

FIG. 1 shows, in simplified form, bi-directional optical transmission system 100, which is connected in a ring configuration. For brevity and clarity of exposition optical transmission system 100 is shown as including only optical nodes 101 through 104, each incorporating an embodiment of the invention. Optical nodes 101 through 104 are interconnected by bi-directional optical transmission media 110, which for brevity and clarity of exposition, in this example, transport active service transmission capacity and by bi-directional optical transmission media 120, which also for brevity and clarity of exposition, in this example, transports standby protection transmission capacity. In this example, optical transmission media 110 and 120 are comprised of optical fibers and each could be comprised of a single optical fiber or two (2) optical fibers. That is, bi-directional optical transmission system 100 could be either a two (2) optical fiber or a four (4) optical fiber system. In a preferred embodiment of the invention, two (2) optical fibers are employed, each of the optical fibers ideally including 50% service bandwidth and 50% protection bandwidth. In an alternative embodiment of the invention, one of the two (2) optical fibers can carry active service transmission capacity and the other optical fiber can carry standby protection transmission capacity. In a four (4) optical fiber system, separate optical fibers are employed to transport active service transmission capacity in both directions of transmission, and separate optical fiber are employed to transport standby protection transmission capacity in both directions of transmission. The optical transmission system 100 could transport, for example, 8, 16, 32, 40, 80, etc. communications channels, i.e., wavelengths. It should be noted that in either the two (2) optical fiber arrangement or the four (4) optical fiber arrangement a separate so-called telemetry channel is employed as a maintenance channel, in addition to the communications channels. Thus, in an eight (8) channel system, nine (9) channels are transported, in a 16 channel system, 17 channels are transported and so on. The maintenance channel transports, among other things, the switching information for configuring optical nodes 101 through 104 in optical transmission system 100. Use of the maintenance channel in transporting protection switching information in order to restore transmission in optical transmission system 100 in response to a transmission media failure or the like is described below. Two (2) and four (4) optical fiber transmission systems are known.

Figure 2:
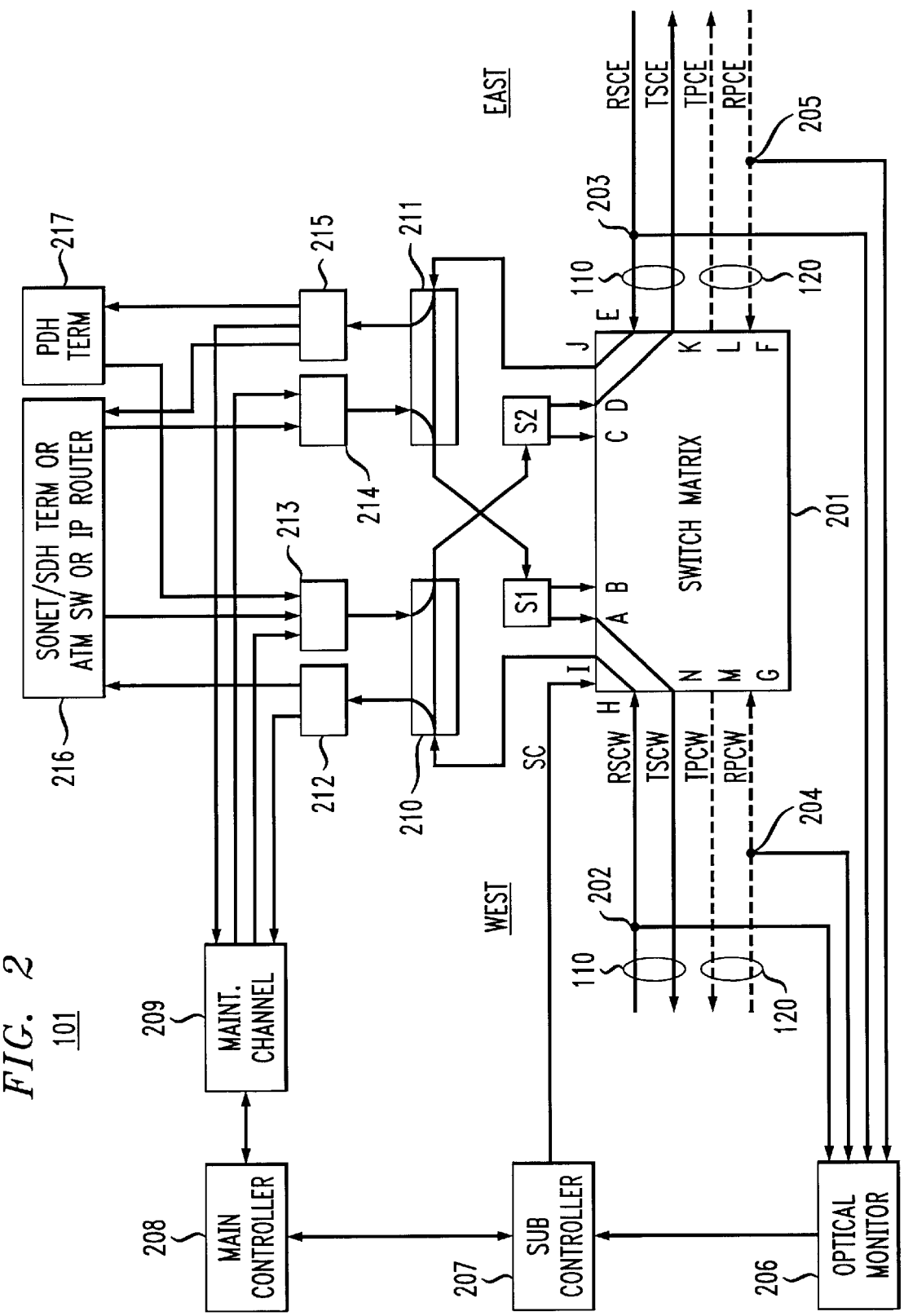
FIG. 2 illustrates, in simplified block diagram form, details of an optical node used in the system of FIG. 1 and including an embodiment of the invention.

FIG. 2 shows, in simplified block diagram form, details of optical nodes 101–104, including an embodiment of the invention and operating in a normal transport mode. That is, there is no optical transmission media failure or other disruption of transmission service. Again, for brevity and clarity of exposition, the bi-directional active service transmission capacity is shown as being transported on optical transmission media 110 and the standby protection transmission capacity is shown as being transported on optical transmission media 120. As indicated above, in a preferred embodiment of the invention, each of at least two optical fibers transports both active service transmission capacity and standby protection transmission capacity. Shown is optical receive service capacity from the west (RSCW) being supplied to input H of applicants' unique optical switch matrix 201, optical transmit service capacity to the west (TSCW) being supplied from output N of optical switch matrix 201, optical transmit protection capacity to the west (TPCW) being supplied from output M of optical switch matrix 201, and optical receive protection capacity from the west (RPCW) being supplied to input G of optical switch matrix 201. Similarly, on the east side of optical node 101, optical receive service capacity (RSCE), is supplied to input E, optical transmit service capacity (TSCE) is supplied from output K, optical receive protection capacity (RPCE) is supplied to input F and optical transmit protection capacity (TPCE) is supplied from output L, all to/from optical switch matrix 201. RSCW supplied to input H is supplied via optical switch matrix 201 to output I and, thereafter, to optical add/drop multiplexer 210. Similarly, RSCE supplied to input E is supplied via optical switch matrix 201 to output J and, thereafter, to optical add/drop multiplexer 211. TSCW from optical add/drop multiplexer 211 is supplied to optical splitter S1, which forms two versions of it. One version of TSCW is supplied to input A and, thereafter, to output N of optical switch matrix 201, while the other version of TSCW is supplied to input B for use if a protection switch is required. Similarly, TSCE from optical add/drop multiplexer 210 is supplied to optical splitter S2, which forms two versions of it. One version of TSCE is supplied to input D and, thereafter, to output K of optical switch matrix 201, while the other version of TSCW is supplied to input C for use if a protection switch is required. Control signals (SC) for controlling operation of optical switch matrix 201 are supplied from sub controller 207. Details of optical switch matrix 201 and its operation are described below.

A relatively small portion of optical energy (for example, less than 2%) being transported via each of RSCW, RPCE, RPCW and RPCE is coupled via optical taps 202, 203, 204 and 205, respectively, to optical monitor 206. Optical monitor 206 determines whether a loss of signal (LOS) has occurred on any of the optical transports supplying optical signals to optical node 101 and, therein, optical switch matrix 201. Details of optical monitor 206 are described below in relationship to FIG. 16. Any LOS information is supplied from optical monitor 206 to sub controller 207, which supplies switch control (SC) signals to optical switch matrix 201 for effecting any required protection switch, and to main controller 208. In turn, main controller 208 supplies switch information, among others, to maintenance channel unit 209. Maintenance channel unit 209 supplies switch information via the maintenance channel to optical combining units 213 and 214, where it is combined with other optical channels (if any) to be added via add/drop multiplexers 210 and 211 to TSCW and TSCE to transported to others of optical nodes 102 through 104 for use in effecting appropriate protection switches at those optical nodes. Note if a protection switch is made, then, the maintenance channel is transported as appropriate via TPCW and/or TPCE. Incoming maintenance channel information is supplied from RSCW and RSCE and if a protection switch has been made from RPCW and/or RPCE as appropriate, where it is dropped via add/drop multiplexers 210 and 211 to optical splitters 212 and 215, respectively. Optical maintenance channel information is supplied from optical splitters 212 and 215 to maintenance channel unit 209 and, thereafter, to main controller 208. Then, any protection switch information being transported on the maintenance channel is supplied to sub controller 207 where it is determined whether a protection switch is required. If a protection switch is required appropriate switch control (SC) signals are supplied from sub controller 207 to optical switch matrix 201. Optical communications channels dropped by add/drop multiplexers 210 and 211 are also supplied to optical splitters 212 and 215, respectively. Optical communications channel information from optical splitters 212 and 215 is supplied to optical terminal equipment 216 as desired. Terminal equipment 216 may include, for example, a synchronous optical network/synchronous digital hierarchy (SONET/SDH) terminal, or an asynchronous transfer mode (ATM) switch, or an internet protocol (IP) router, or the like. Additionally, optical communications channel information from optical splitter 215 is supplied to peizosynchronous digital hierarchy (PDH) terminal 217. Communications channel information from terminal equipment 216 is supplied to be added for transport to optical combining units 213 and 214 and, thereafter, to add/drop multiplexers 210 and 211. Optical communications channel information from peizosynchronous digital hierarchy (PDH) terminal 217 is supplied to optical combining unit 213 and, thereafter, to add/drop multiplexer 210 to be added to TSCE and/or TPSE. Note that the peizosynchronous digital hierarchy (PDH) communications information from terminal 217 is span related and, therefore, is only supplied, in this example, to TSCE and/or TPCE.

Figure 3:
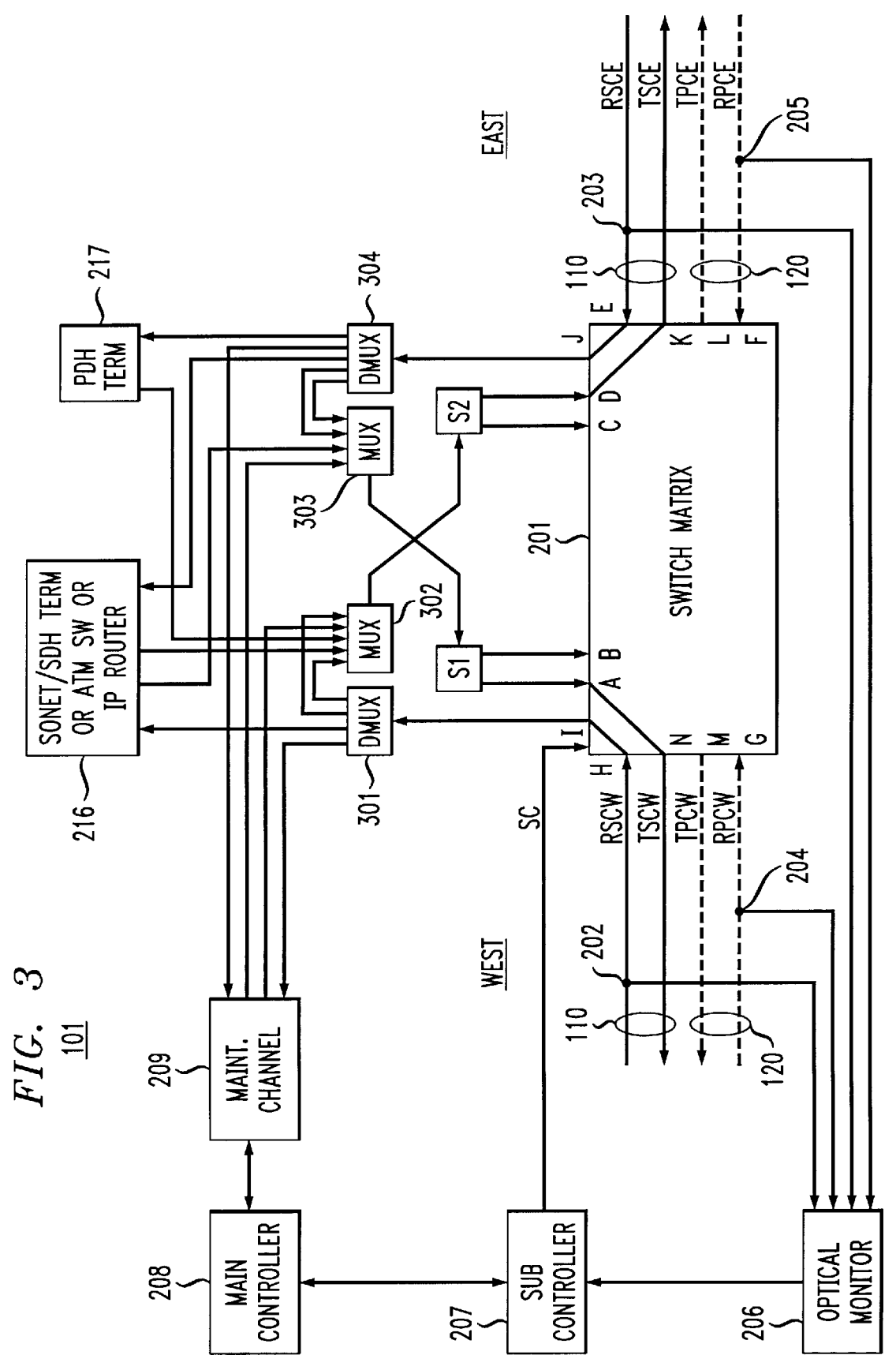

FIG. 3 illustrates, in simplified block diagram form, details of another version of an optical node that can be used in optical nodes 1-1 through 104 in the system of FIG. 1 and including an embodiment of the invention. All elements of the version of optical node 101 shown in FIG. 3 that are identical to those, described above, regarding the version of optical node 101 shown in FIG. 2 have been similarly numbered and will not be described again. The differences between the versions of optical node 101 shown in FIG. 2 and FIG. 3 are that in FIG. 3 optical demultiplexer (DMUX) 301 and optical multiplexer (MUX) 302 replace add/drop multiplexer 210, optical splitter 212 and optical combining unit 213, and optical demultiplexer (DMUX) 303 and optical multiplexer (MUX) 304 replace add/drop multiplexer 211, optical splitter 214 and optical combining unit 215. Otherwise the elements and operation of the versions of optical node 101 shown in FIGS. 2 and 3 are identical. It will be apparent to those skilled in the art how DMUX 301 and MUX 302, and DMUX 303 and MUX 304 are a direct substitute for add/drop multiplexer 210, optical splitter 212 and optical combining unit 213, and for add/drop multiplexer 211, optical splitter 214 and optical combining unit 215, respectively.

Figure 4:
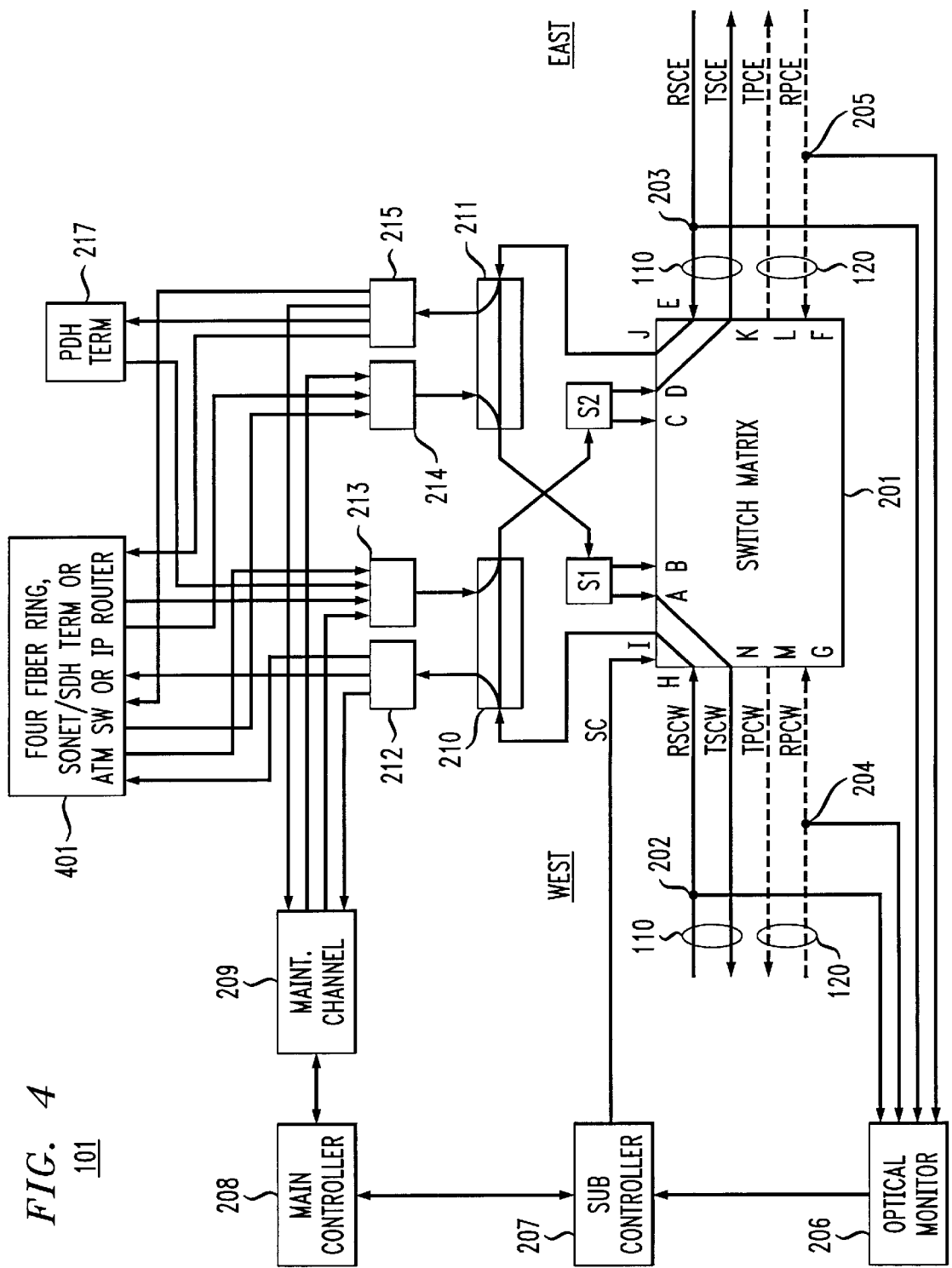
FIG. 4 illustrates, in simplified block diagram form, an optical node especially suited for a four optical fiber system and including an embodiment of the invention.

FIG. 4 illustrates, in simplified block diagram form, an optical node especially suited for a four optical fiber system and including an embodiment of the invention. All elements of the version of optical node 101 shown in FIG. 4 that are identical to those, described above, regarding the version of optical node 101 shown in FIG. 2 have been similarly numbered and will not be described again. The differences between the versions of optical node 101 shown in FIG. 2 and FIG. 4 are that in FIG. 4 four (4) optical fibers are employed to transport the incoming and outgoing optical signals and, thereby, providing the active transmit and receive service capacity, and the standby transmit and receive protection capacity. Thus, separate optical fibers are employed to transport each of RSCW, TSCW, TPCW and RPCW. Additionally, terminal equipment 401 includes a four (4) optical fiber ring, or a SONET/DSH terminal or an ATM switch or an IP router. Circuit paths are provided from optical splitters 212 and 215 to equipment 401, and from equipment 401 to optical combining units 213 and 214 to accommodate the four optical fiber ring, as will be apparent to those skilled in the art.

Figure 5:
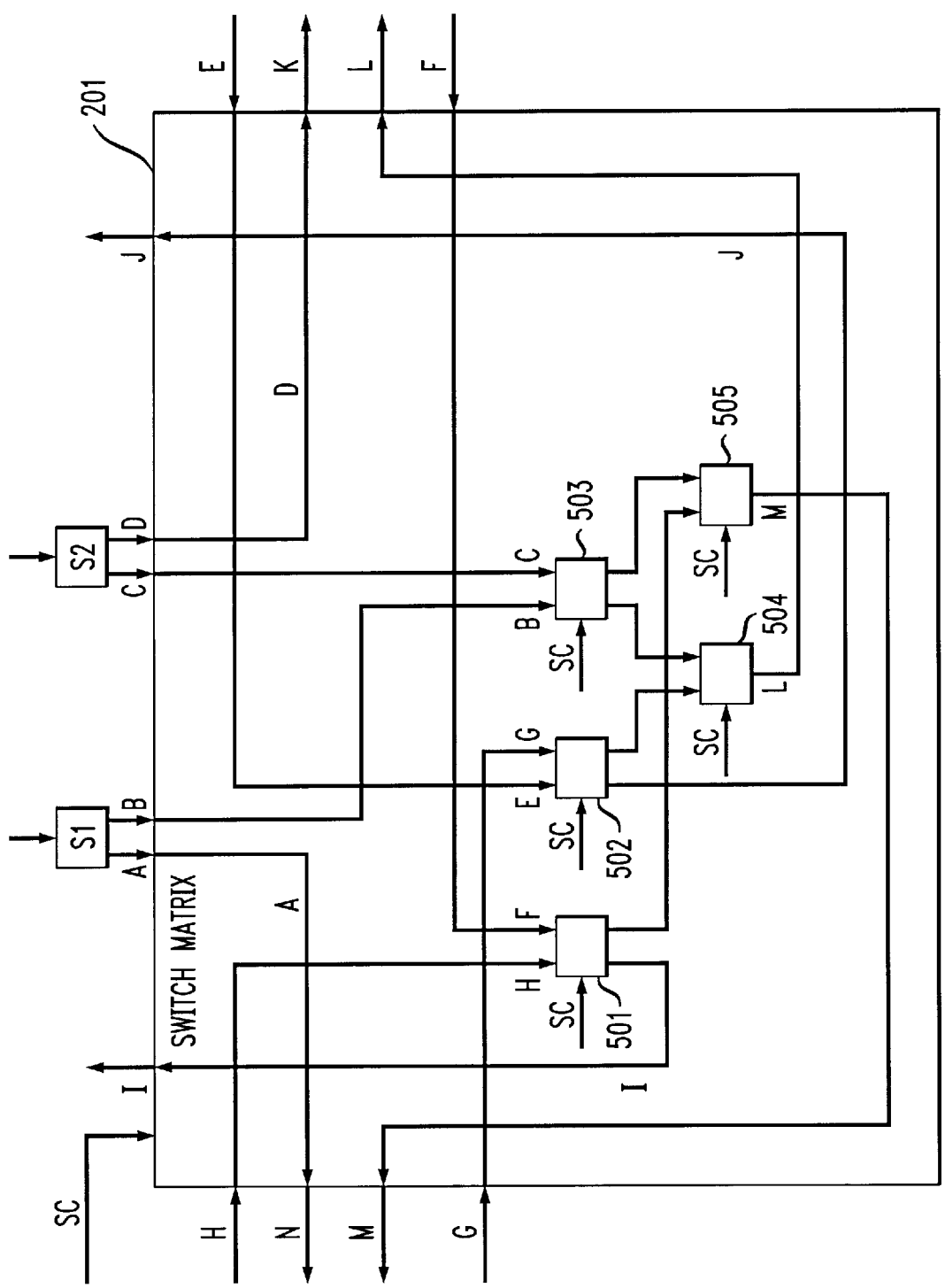
FIG. 5 illustrates, in simplified block diagram form, details of applicants' unique optical switch matrix employed in an embodiment of their invention.

FIG. 5 illustrates, in simplified block diagram form, details of applicants' unique optical switch matrix, e.g., optical switch matrix 201, employed in an embodiment of their invention. Note that in this example inputs A through H and outputs I through N of optical switch matrix 201 are optical. Shown in FIG. 5 are optical splitter S1 dual feeding optical communications channels normally intended for west bound transmission to inputs A and B of optical switch matrix 201, and optical splitter S2 dual feeding optical communications channels normally intended for east bound transmission to inputs C and D of optical switch matrix 201. In this example, it is noted that input A is connected directly to output N in the west bound direction, and that input D is connected directly to output K in the east bound direction. Of course, these "direct" connections can be made in any of a number of ways, for example, they can be made by assigning optical switch units to effect the desired connections at system setup, or dynamically in response to control signals These "direct" connections significantly simplify optical switch matrix 201 and make it significantly more efficient. Optical switch matrix 201 is further comprised of controllable optical switches 501 through 505. Optical switches 501 through 505 are controlled via switch control (SC) signals from sub controller 207 (FIG. 2) to effect the bulk switching of optical signals including communications channels being supplied to them. This bulk optical switching is an important feature of applicants' unique optical switch matrix because it more efficiently effects switching of the optical signals. Again, note that switching with prior known arrangements was on an optical channel-by-optical channel basis, which is significantly less efficient than applicants' use of bulk switching. It should be further noted that although optical switch matrix 201 has eight (8) inputs and six (6) outputs, only 10 switching states are allowed of which two (2) switching states are designated by preassigning the optical input and optical output connections. This preassignment of two of the optical switch states may be realized in a number of ways, for example, permanent optical connections, optical switches always switched to those optical switch states, optical switches dynamically switched to the desired states, or the like. Thus, there are effectively only eight (8) allowable switching states of optical switch matrix 201, which significantly reduces the complexity of the switching of the optical signals and allows the use of relatively simple switching elements that are readily available. Indeed, no large complex switching matrix is required as would be in an optical channel-by-optical channel switching arrangement or in an optical cross connect switch. Further note that two (2) of the allowable optical switching states of optical switch matrix 201 are employed only in pass through optical nodes.

Figure 6:
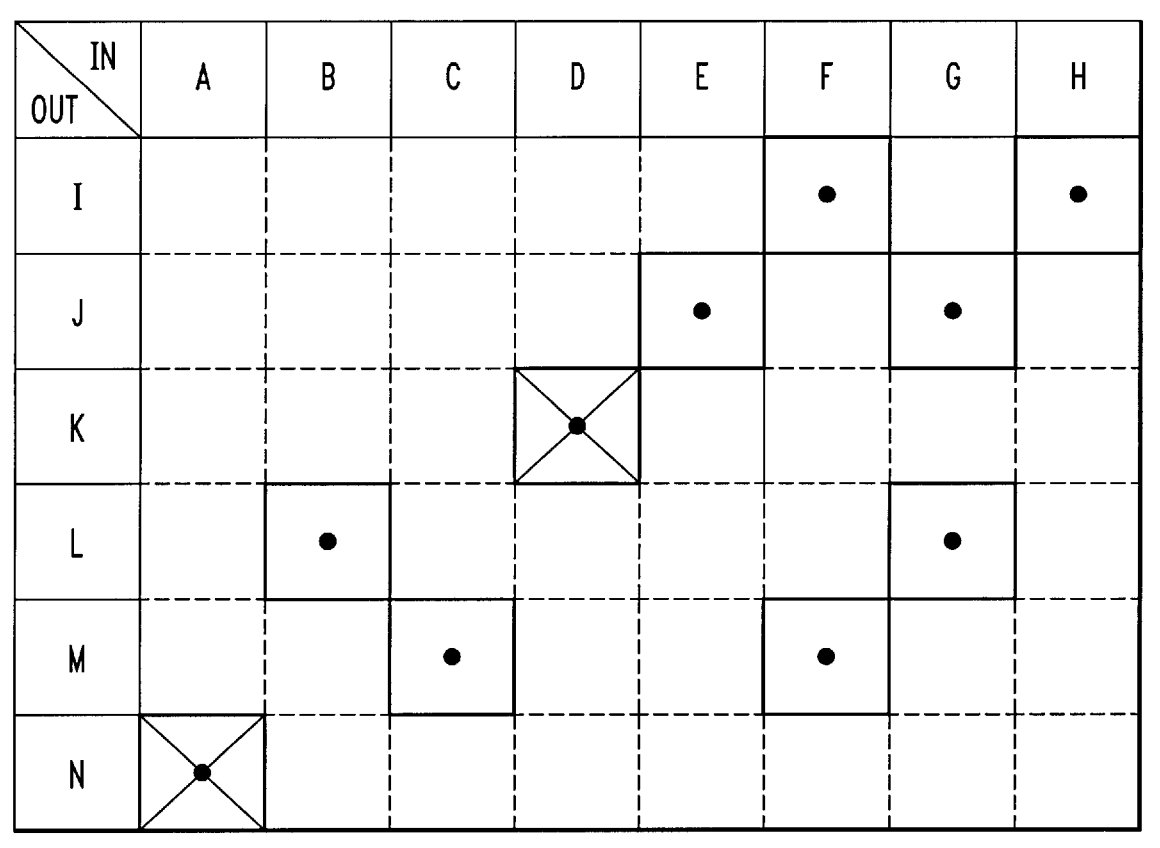

FIG. 6 is a state diagram showing the allowable switching states of the optical switch matrix 201 of FIG. 5 for both terminal optical nodes and intermediate pass through optical nodes. Note that the allowable switching states are indicated by a "dot" in the middle of a square representative of an allowable switching state, and a switched state or preassigned, e.g. a permanently connected, switched state is indicated by a "X" in the square representative of the switched state or preassigned state. Thus, as seen in FIG. 6, input A is preassigned, i.e., permanently connected, to output N, input B can be controllably connected to output L, input C can be controllably connected to output M, input D is preassigned, i.e., permanently connected, to output K, input E can be controllably connected to output J, input F can be controllably connected to output I or output M, input G can be controllably connected to output J or output L and input H can be controllably connected to output I, all of optical switch matrix 201 shown in FIG. 5.

Returning to FIG. 5, the above controllable switching states of simplified optical switch matrix 201, are realized by employing controllable optical switching units 501 through 505. To this end, inputs H and F are supplied to individual inputs of optical switching unit 501. Inputs E and G are supplied to individual inputs of optical switching unit 502. Inputs B and C are supplied to individual inputs of optical switching unit 503. One output of optical switching unit 501 is supplied to optical output I. Consequently, an optical signal supplied via either input H or input F can be controllably supplied to output I via optical switching unit 501, in response to control signals SC. One output of optical switching unit 502 is supplied to optical output J. Consequently, an optical signal supplied via either input E or input G can be controllably supplied to output J via optical switching unit 502, in response to control signals SC. Another output from optical switching unit 501 is supplied to one input of optical switching unit 505, and an output from optical switching unit 503 is supplied to another input of optical switching unit 505. Consequently, an optical signal supplied via either input C or input F can be controllably supplied to output M via optical switching units 505, 501 and 503, in response to control signals SC. Another output from optical switching unit 502 is supplied to one input of optical switching unit 504, and another output from optical switching unit 503 is supplied to another input of optical switching unit 504. Consequently, an optical signal supplied via either input B or input G can be controllably supplied to output L via optical switching units 504, 502 and 503, in response to control signals SC.

As shown in FIG. 5, optical switches 501, 502 and 503 are so-called 2X2 switches having two (2) inputs and two (2) outputs, and optical switches 504 and 505 are so-called 2X1 switches having two (2) inputs and one (1) output. As is known in the art, a 2X1 optical switch is a primary switch element. That is, a 2X1 or 1X2 optical switch element is the simplest to implement. The 2X2 optical switch element is the next simplest switch element to implement.

Figure 7:
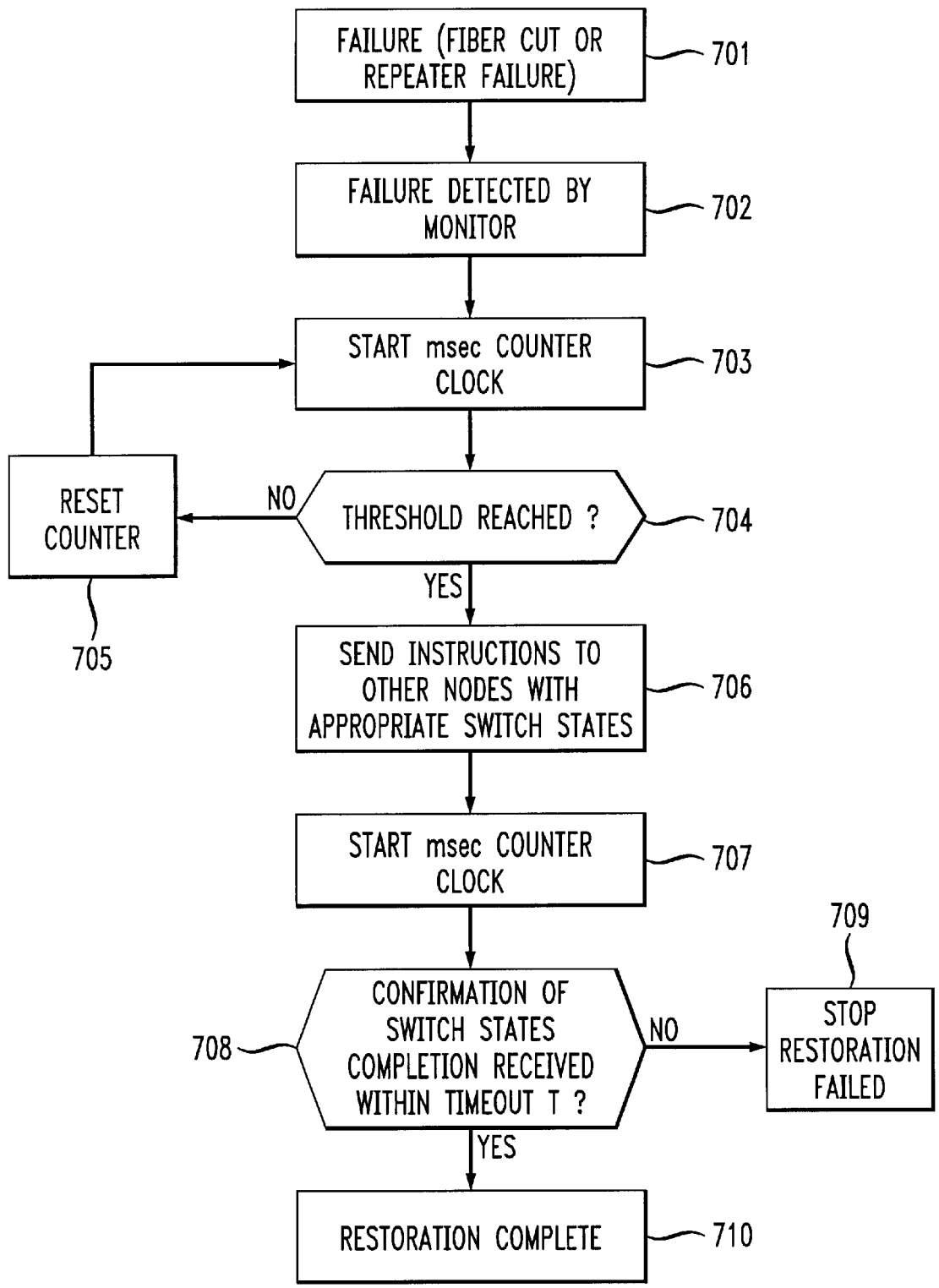
FIG. 7 is a flow chart showing the operation of an optical node in response to a detected optical transmission media failure.

FIG. 7 is a flow chart showing the operation of main controller 208 of an optical node, in response to a detected optical transmission media failure. The process is started in step 701 in response to a failure indication from sub controller 207. Step 702 indicates that optical monitor 206 has indicated a failure. Then, step 703 starts a so-called millisecond (msec) counter clock. Step 704 tests to determine if a predetermined threshold time interval in step 703. If the test result in step 704 is NO, step 705 resets the counter of step 703, and control is returned to step 703. Thereafter, steps 703, 704 and 705 are iterated unit step 704 yields a YES result and control is transferred to step 706. Step 706 causes instructions to be sent via the maintenance channel to other optical nodes in the optical ring communications system including appropriate optical switch states. Then, step 707 starts a millisecond (msec) counter clock. Step 708 tests to determine if confirmation is received via the maintenance channel that the switching of the switch states sent in step 706 have been completed within a predetermined time out interval, T, as indicated by the counter in step 707. If the test result in step 708 is NO, step 709 stops the switching process because the attempt at restoration has failed. If the test result in step 708 is YES, step 710 indicates that the optical transmission system restoration has been completed.

Figure 8:
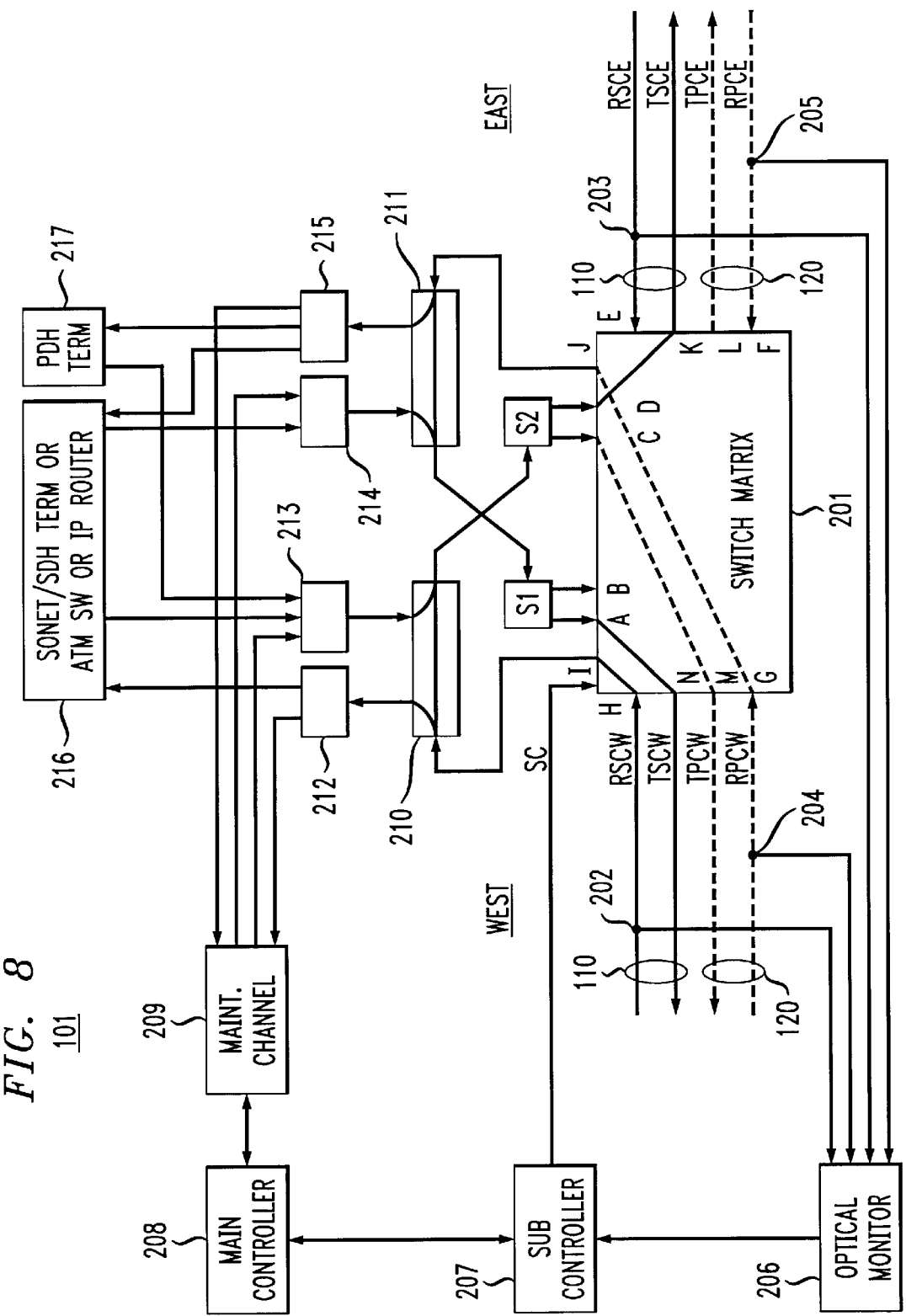
FIG. 8 illustrates, in simplified block diagram form, details of an optical node effecting an optical protection switch in response to a transmission media failure on the east side of the optical node.
Figure 9:
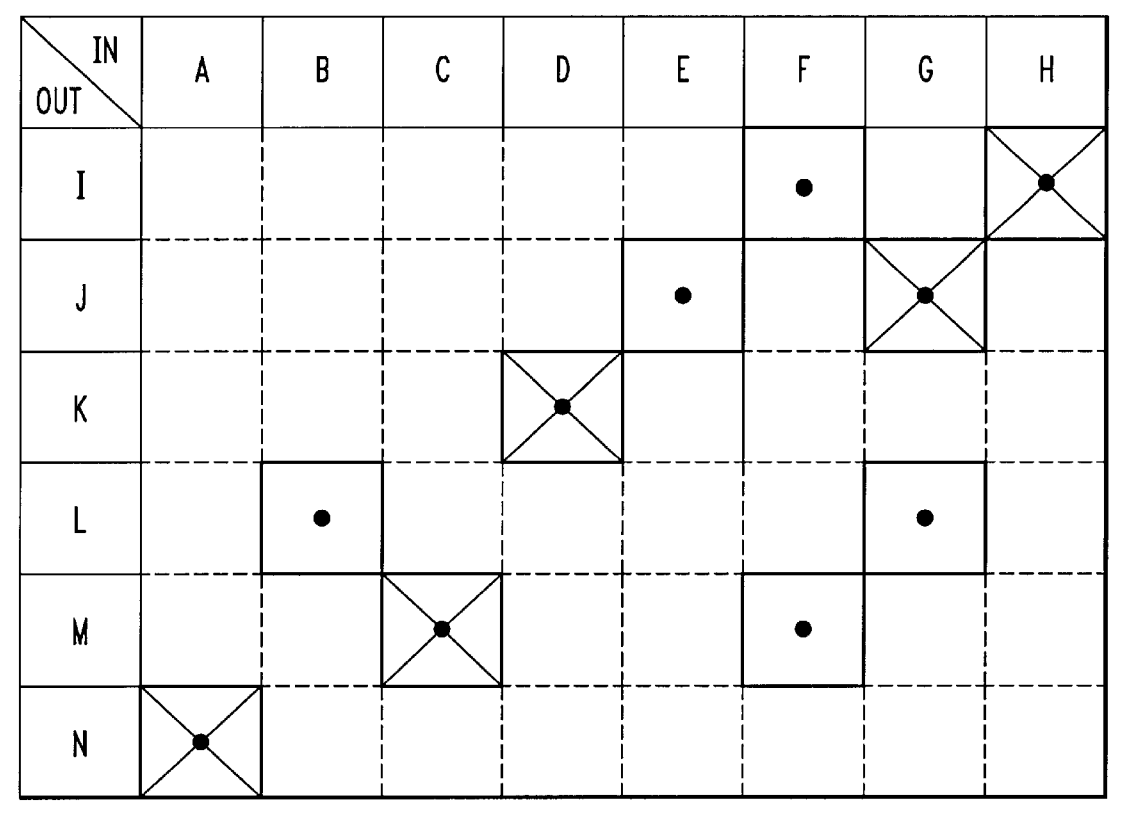

FIG. 8 illustrates, in simplified block diagram form, details of an optical node, e.g., 101, effecting an optical protection switch in response to a transmission media failure on the east side of the optical node. Upon optical detector 206 detecting the failure, sub controller 207 sends optical switch control signals SC to optical switch matrix 201 and to main controller 208. Optical switch matrix 201 effects the optical switch indicated in dashed outline. That is, input C is controllably connected to output M and input G is controllably connected to output J. Note that input H remains connected to output I, and the preassigned, i.e., permanent, optical connections of input A to output N and input D to output K remain intact. FIG. 9 is a state diagram showing the optical switch states, indicated by "X", for effecting the optical protection switch in the optical node of FIG. 8. Main controller 208 transmits instructions, via the maintenance channel, including appropriate optical switch states to the other optical nodes in the optical ring transmission system.

Figure 10:
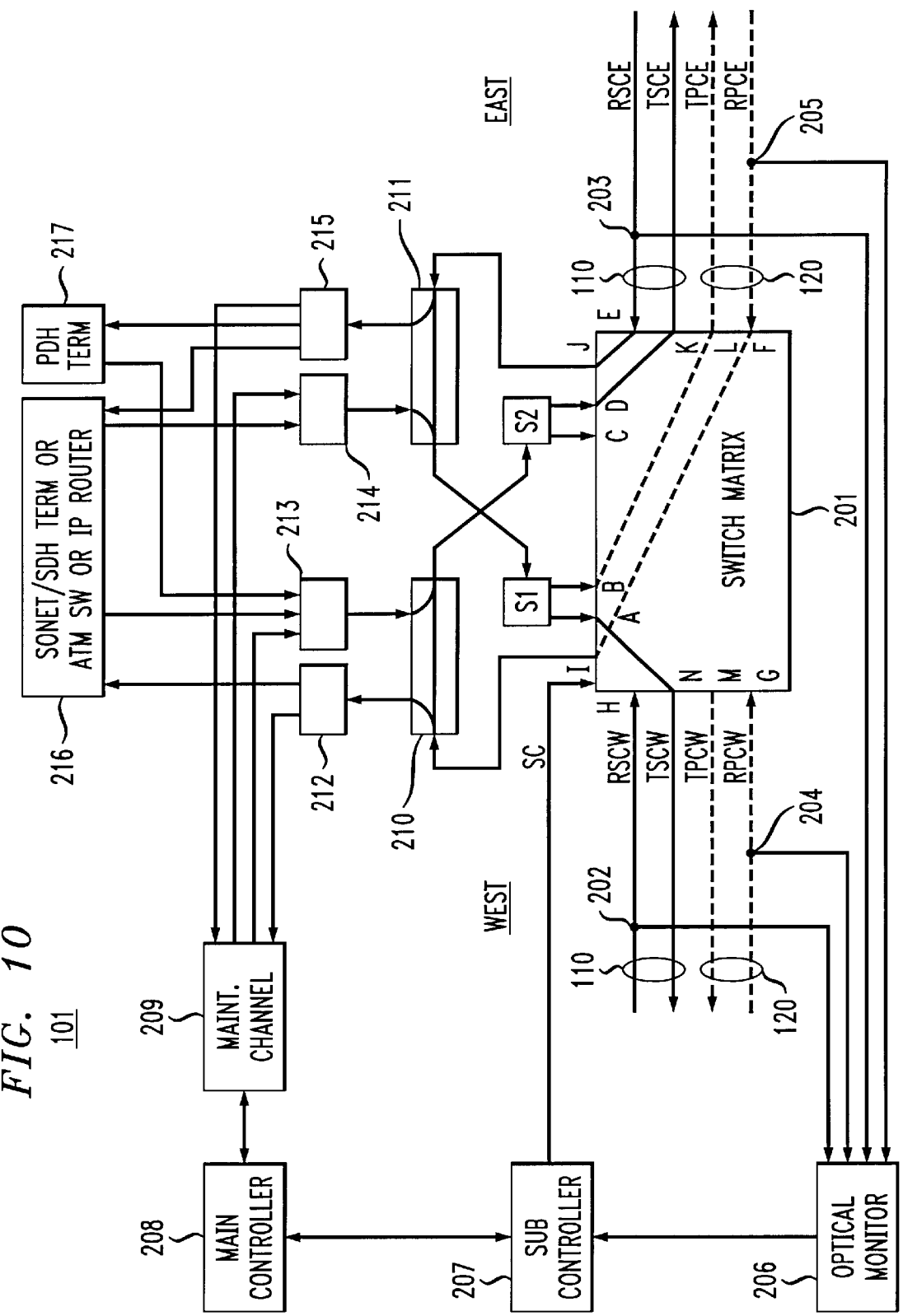
FIG. 10 illustrates, in simplified block diagram form, details of an optical node effecting an optical protection switch in response to a transmission media failure on the west side of the optical node.
Figure 11:
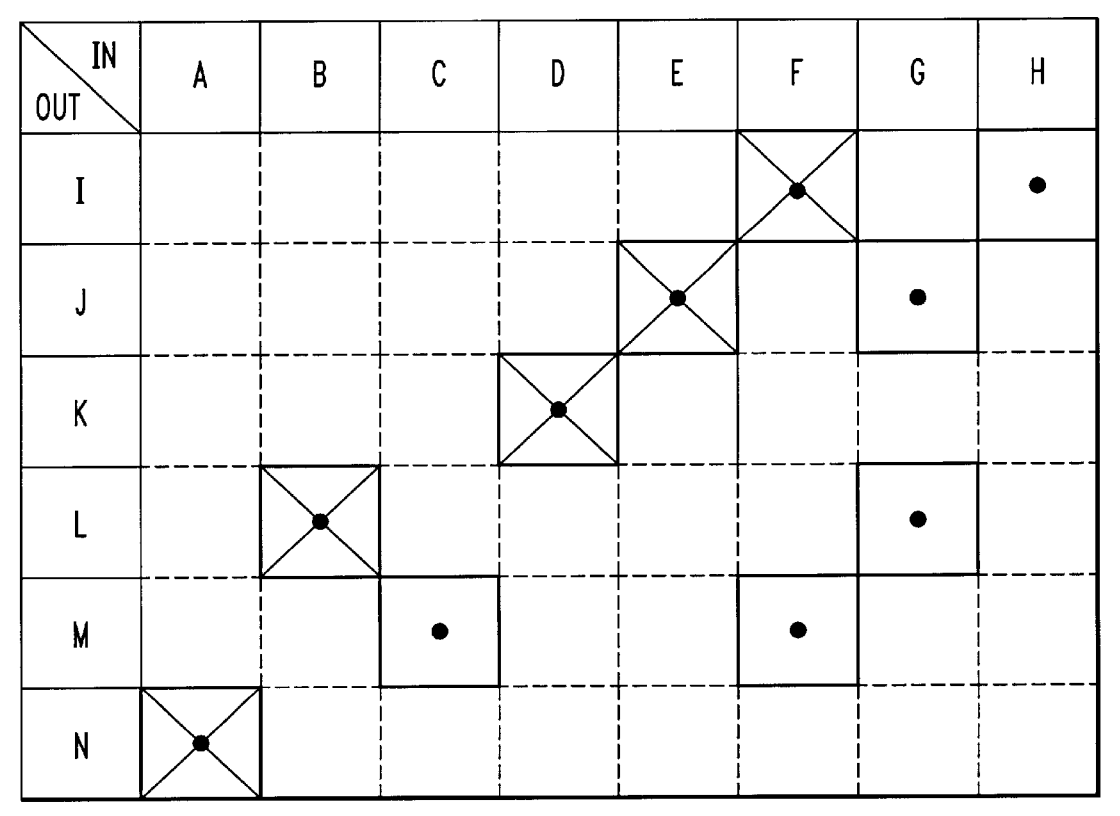

FIG. 10 illustrates, in simplified block diagram form, details of an optical node, e.g., 101, effecting an optical protection switch in response to a transmission media failure on the west side of the optical node. Upon optical detector 206 detecting the failure, sub controller 207 sends optical switch control signals SC to optical switch matrix 201 and to main controller 208. Optical switch matrix 201 effects the optical switch indicated in dashed outline. That is, input B is controllably connected to output L and input F is controllably connected to output I. Note that input H remains connected to output I and the preassigned, i.e., permanent, optical connections of input A to output N and input D to output K remain intact. FIG. 11 is a state diagram showing the optical switch states, indicated by "X", for effecting the optical protection switch in the optical node of FIG. 8. Main controller 208 transmits instructions, via the maintenance channel, including appropriate optical switch states to the other optical nodes in the optical ring transmission system.

Figure 12:
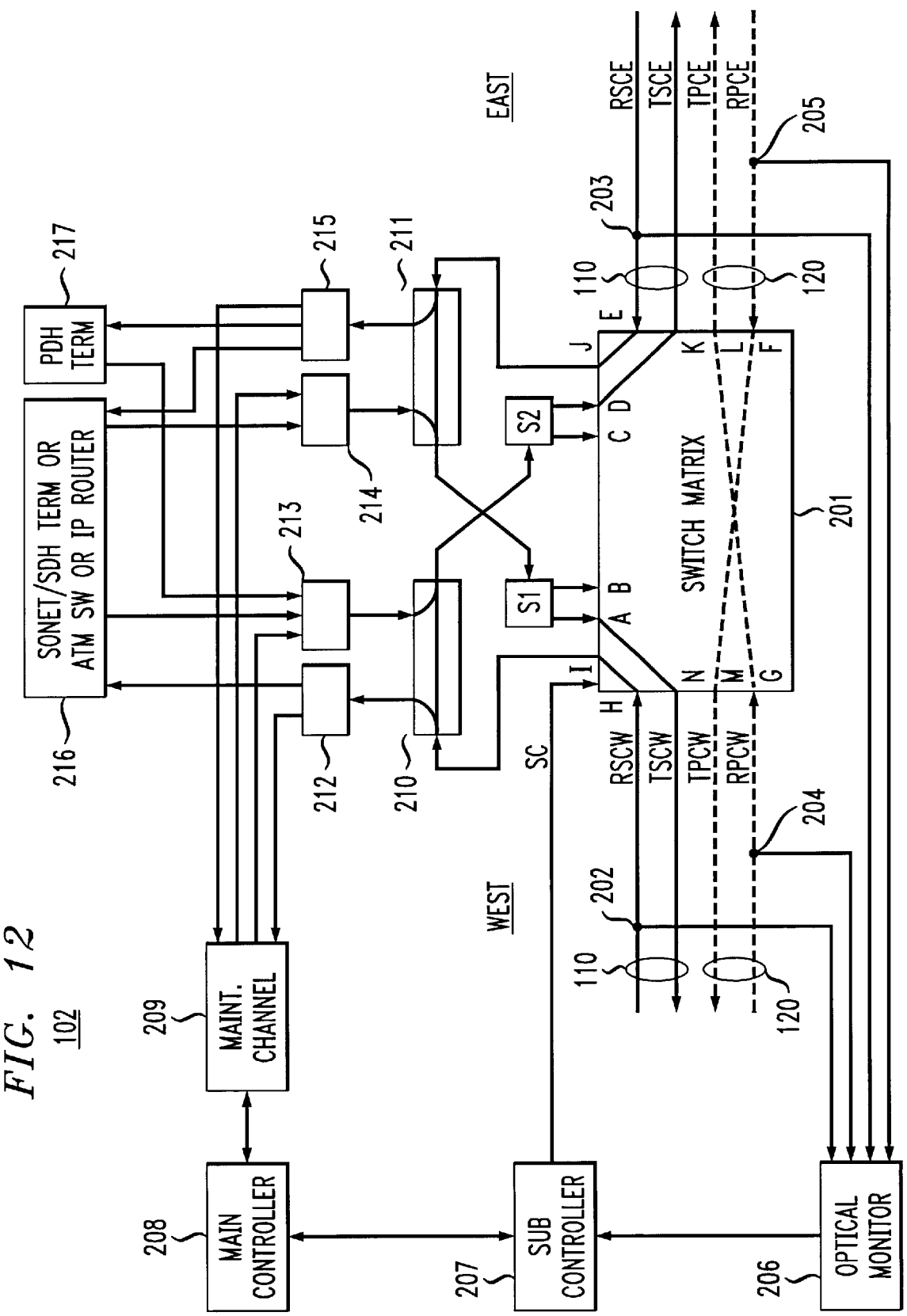
FIG. 12 illustrates, in simplified block diagram form, details of an optical node effecting a pass through optical protection switch in response to a transmission media failure.
Figure 13:
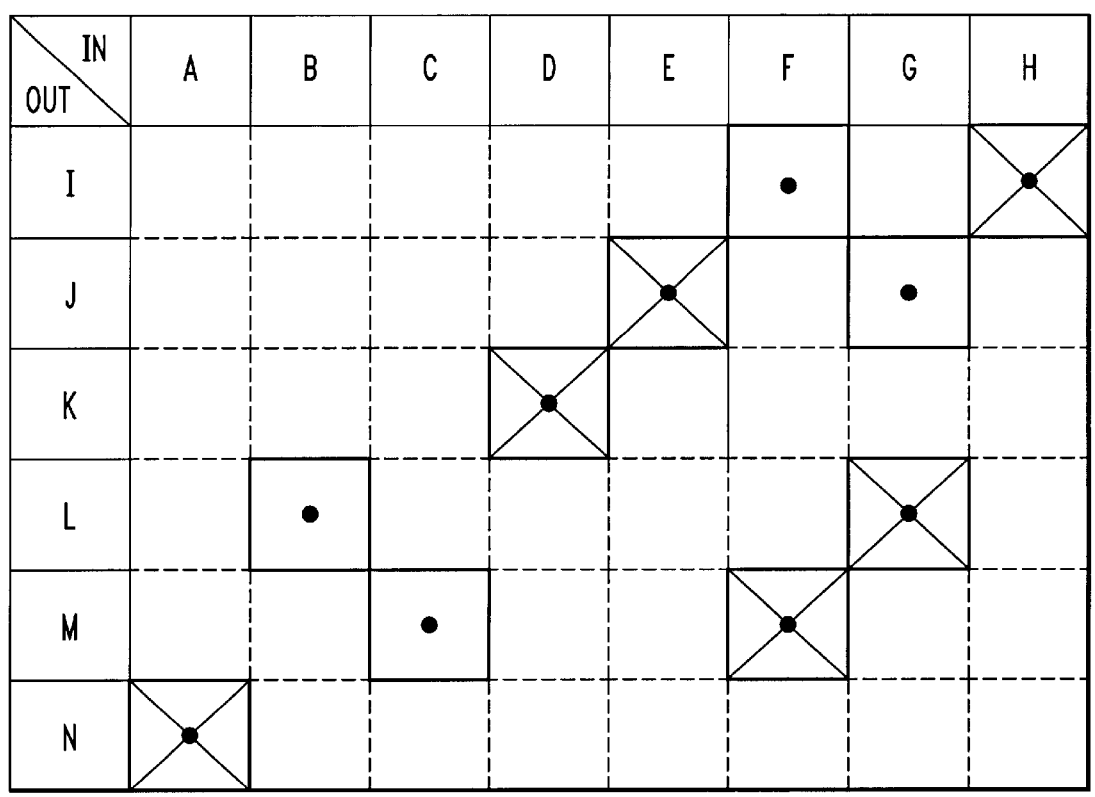
FIG. 13 is a state diagram showing the optical switch states for effecting the pass through optical protection switch in the optical node of FIG. 12.

FIG. 12 illustrates, in simplified block diagram form, details of an optical node, e.g., 102, effecting a pass through optical protection switch in response to a transmission media failure and instructions received via the maintenance channel. As shown in dashed outline, input F is connected to output M and input G is connected to output L. FIG. 13 is a state diagram showing the optical switch states, indicated by "X", for effecting the optical protection switch in the optical node of FIG. 12. Main controller 208 transmits instructions, via the maintenance channel, including appropriate optical switch states to the other optical nodes in the optical ring transmission system.

Figure 14:
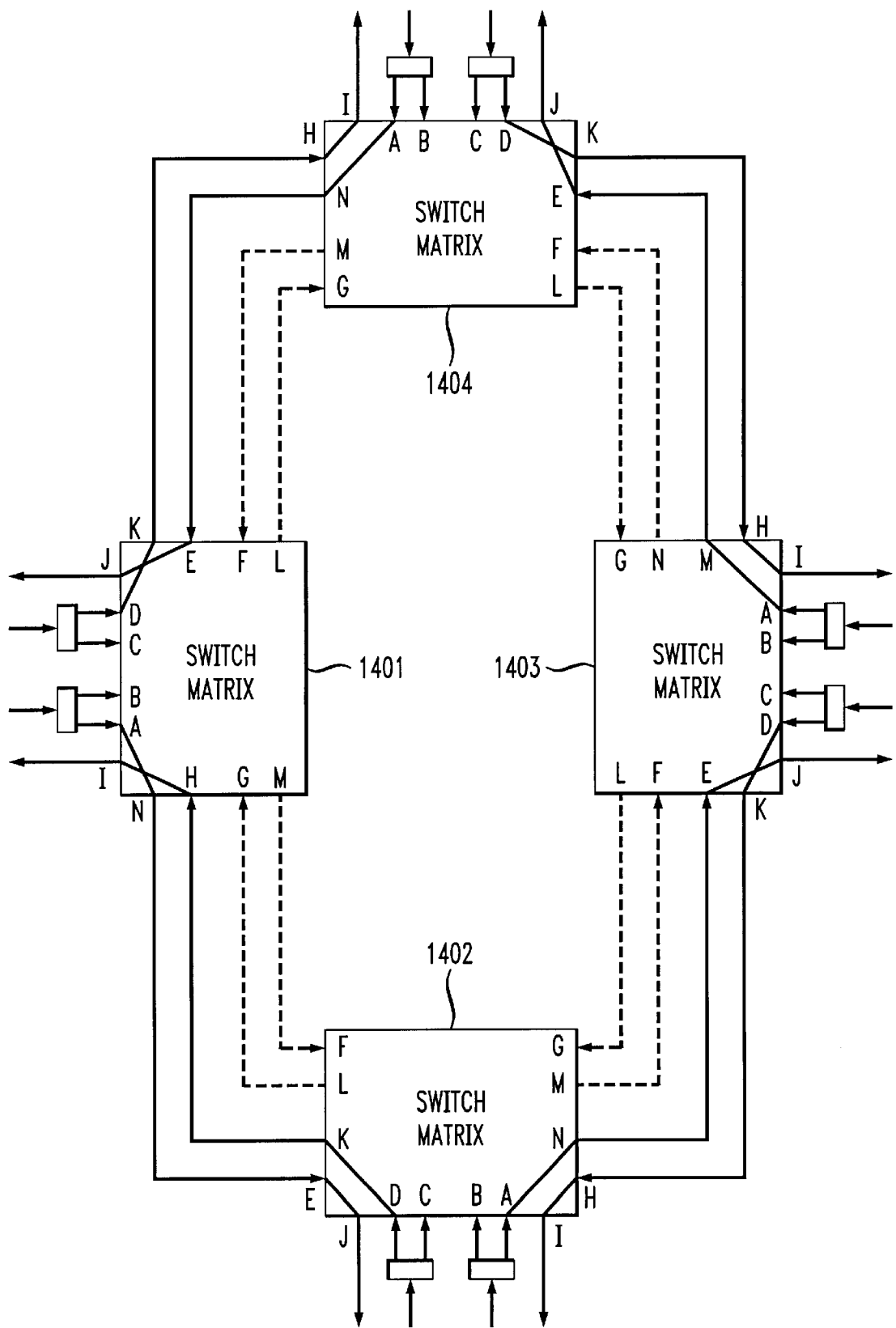
FIG. 14 shows, in simplified block form, a plurality of optical nodes connected in a ring configuration and the optical switch matrix connections in each of the optical nodes for normal operation.

FIG. 14 shows, in simplified block form, a plurality of optical nodes, namely, 1401 through 1404, connected in a ring configuration and the optical switch matrix connections in each of the optical nodes for normal operation. The optical connections are the same as those shown in optical switch matrix 201 of FIG. 2 and are not explained again here.

Figure 15:
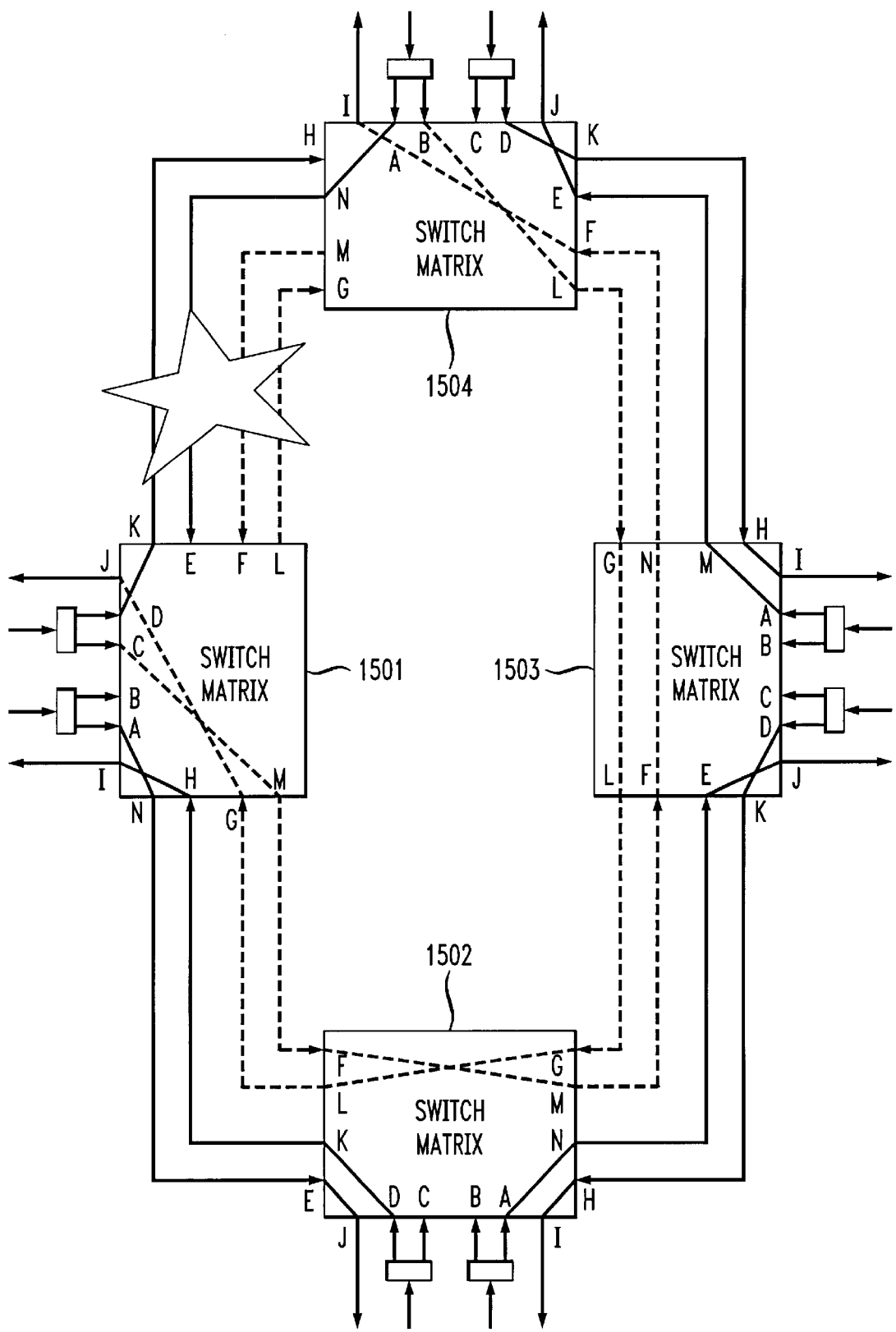
FIG. 15 shows, in simplified block form, a plurality of optical nodes connected in a ring configuration and the optical switch matrix connections in each of the optical nodes for effecting an optical protection switch in response to a transmission media failure.

FIG. 15 shows, in simplified block form, a plurality of optical nodes, namely, 1501 through 1504, connected in a ring configuration and the optical switch matrix connections in each of the optical nodes for effecting an optical protection switch in response to a transmission media failure. As shown, the optical transmission media failure is to the east of optical node 1501 and to the west of optical node 1504. Thus optical node 1501 responds to a detected east side optical media failure, and optical node 1504 responds to a detected west side optical failure. The optical switch connections effected in optical node 1501 are identical to those shown in optical switch matrix 201 of FIG. 8 in response to an east side optical media failure, as described above in relationship to FIG. 8. The optical switch connections effected in optical node 1504 are identical to those shown in optical switch matrix 201 of FIG. 10, as described above in relationship to FIG. 10.

Figure 16:
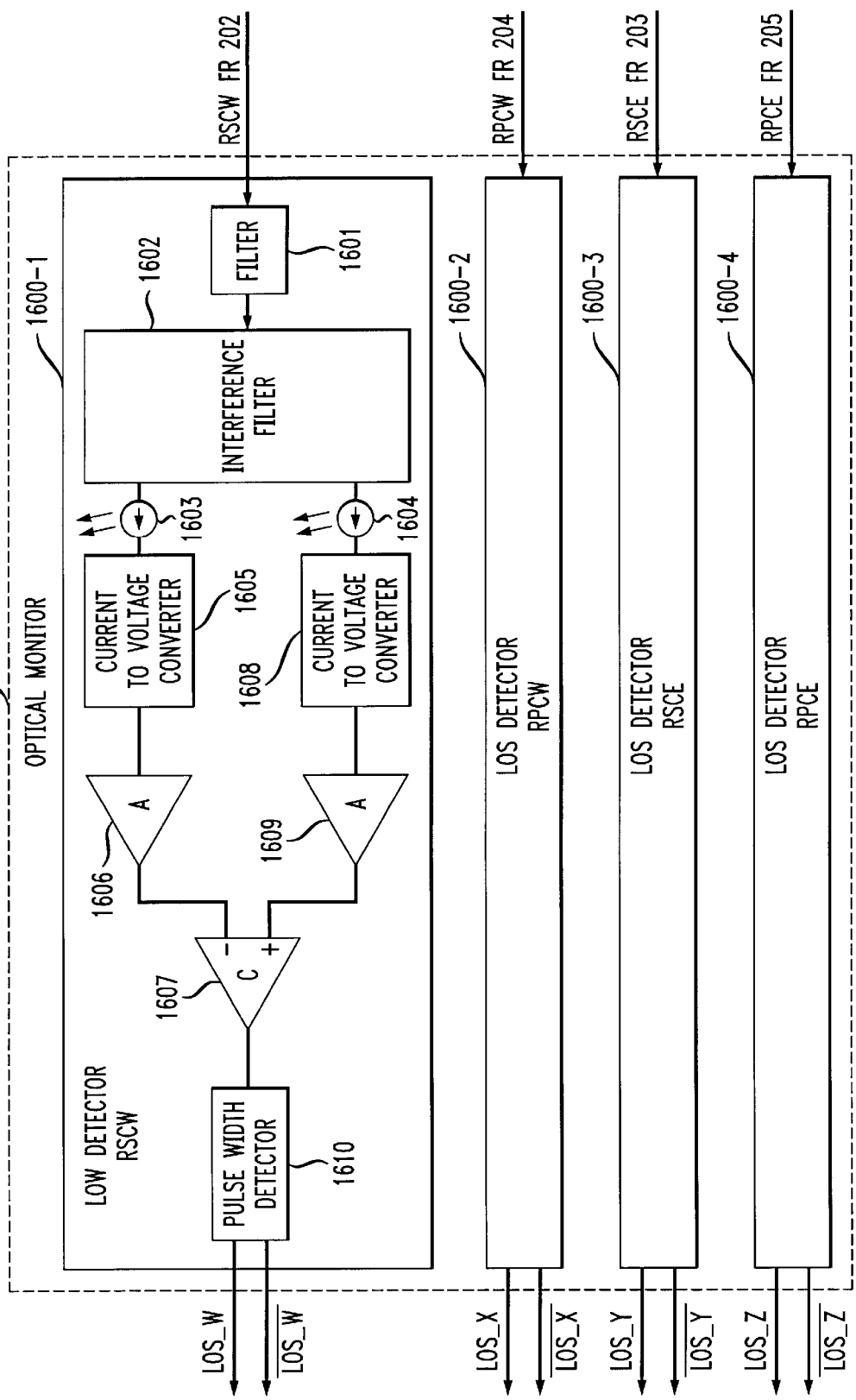
FIG. 16 shows, in simplified block diagram form, details of optical monitor 206 of FIG. 2.

FIG. 16 shows, in simplified block diagram form, details of optical monitor 206 of FIG. 2. In this example, optical monitor 206 is comprised of four (4) LOS detector units, namely, 1600-1 through 1600-4. Incoming optical signal RSCW is supplied to LOS detector RSCW 1600-1 from optical tap 202 (FIG. 2), incoming optical signal RPCW is supplied to LOS detector RPCW 1600-2 from optical tap 204, incoming optical signal RSCE is supplied to LOS detector RSCE 1600-3 from optical tap 203 and incoming optical signal RPCE is supplied to LOS detector RPCE 1600-4 from optical tap 205. Optical monitors 1600-1 through 1600-4 are all identical and, therefore, only optical monitor 1600-1 will be explained in detail. Thus, optical monitor 1600-1 includes optical filter 1601, which, in this example, is a conventional optical wavelength multiplexer that is utilized to remove the maintenance channel from incoming optical signal RSCW. The remaining optical signal of RSCW includes the communications channels, i.e., wavelengths, and is supplied to optical interference filter 1602, which, in this example, is a known optical band-pass filter. Specifically, interference filter 1602 separates a supplied optical signal into a so-called in-band optical signal and a so-called out-of-band optical signal. The in-band optical signal is comprised of, for example, optical signals having wavelengths within a predetermined range, one example being 1548 nm (nanometers) to 1562 nm (i.e., $\lambda i$) and the out-of-band optical signal is comprised of optical signals out side of the predetermined in-band range of wavelengths. Filter 1602 supplies the in-band optical signal to photodetector 1603 and the out-of-band optical signal to photodetector 1604. Photodetectors 1603 and 1604 convert the optical signals supplied thereto into electrical signals (e.g., current) in well known fashion. The current from photodetector 1603 is supplied to current-to-voltage converter 1605, which converts it to a voltage signal. One such current-to-voltage converter, which may be employed for converter 1605, in this example, is a conventional 2V/mA converter. The voltage signal is supplied from converter 1605 to amplifier 1606, which is essentially a buffer amplifier, i.e., a 1:1 amplifier. The output from amplifier 1606 is supplied to a negative input of comparator (C) 1607. The current from photodetector 1604 is supplied to current-to-voltage converter 1608, which converts it to a voltage signal. One such current-to-voltage converter, which may be employed for converter 1608, in this example, is also a conventional 2V/mA converter. The voltage signal is supplied from converter 1608 to amplifier 1609, which in this example is a 50:1 amplifier. This amplification factor of 50:1 is used to equalize the in-band signal with the out-of-band signal. This 50:1 amplification factor is employed as a threshold for determining whether a LOS has occurred. Indeed, we have recognized that when a LOS has not occurred, the in-band signal level is approximately 60 times larger than the out-of-band signal level. When a LOS has occurred the in-band signal level is approximately 40 times as large as the out of-band signal level. The output from amplifier 1609 is supplied to a positive input of comparator (C) 1607. Comparator 1607 yields a low state, i.e., logical zero (0), output when the output from amplifier 1606 is greater than the output from amplifier 1609, i.e., the in-band signal level is greater than the amplified out-of-band signal level. Otherwise, comparator 1607 yields a high state, i.e., logical one (1), output. The output from comparator 1607 is supplied to pulse width detector 1610, which detects the duration that the output from comparator remains in a high state after a low-to-high state transition. If the duration of the high state output from pulse width detector 1610 persists for a predetermined interval, for example, for between zero (0) and 3.2 seconds, it is concluded that a LOS has occurred. When a LOS has occurred pulse width detector 1610 supplies as outputs LOS_W and $\overline{\text{LOS\_W}}$, which are supplied to sub controller 207 (FIG. 2).

LOS detector RPCW 1600-2, LOS detector RSCE 1600-3 and LOS detector RPCE 1600-4 are essentially identical to LOS detector RSCW 1600-1 in both structure and operation. LOS detector 1600-2 supplies as outputs LOS_X and $\overline{\text{LOS\_X}}$, LOS detector 1600-3 supplies as outputs LOS_Y and $\overline{\text{LOS\_Y}}$ and LOS detector 1600-4 supplies as outputs LOS_Z and $\overline{\text{LOS\_Z}}$, all of which are supplied to sub controller 207.

Sub controller 207 effects the following logic:

If $LOS\_W$ and $\overline{LOS\_Z}$ then $\overline{PROT\_SWITCH\_WEST}$=HIGH (1)

If $LOS\_Z$ and $\overline{LOS\_W}$ then $\overline{PROT\_SWITCH\_WEST}$=HIGH (2)

If $LOS\_W$ and $LOS\_Z$ then WEST remains in current state (3)

If $\overline{LOS\_W}$ and $\overline{LOS\_Z}$ then WEST remains in current state (4)

If $LOS\_Y$ and $\overline{LOS\_X}$ then $\overline{PROT\_SWITCH\_EAST}$=HIGH (5)

If $LOS\_X$ and $\overline{LOS\_Y}$ then $\overline{PROT\_SWITCH\_EAST}$=HIGH (6)

If $LOS\_Y$ and $LOS\_X$ then EAST remains in current state (7)

If $\overline{LOS\_Y}$ and $\overline{LOS\_X}$ then EAST remains in current state (8).

It will be apparent to those skilled in the art that appropriate interface apparatus is required to interface an optical node and the optical switch matrix therein to the optical transmission media. The interface apparatus will necessarily be different to some extent depending on whether two or four optical transmission media, e.g., optical fibers, are employed.

What is claimed is:

1. A controllable optical switch matrix for use in an optical node intended to be connected with a plurality of optical nodes in an optical transmission ring configuration and the controllable switch matrix intended for use in an optical node to interface with terminal equipment including a plurality of optical inputs and a plurality of optical outputs, the controllable optical switch matrix comprising:

a plurality of optical inputs to which incoming optical signals are intended to be supplied;

a plurality of optical outputs to which outgoing optical signals are intended to be supplied;

wherein said controllable optical switch matrix has a first predetermined number of possible optical switching states, and at least first and second of said optical switch matrix optical inputs being directly optically connected in a predetermined fixed one-to-one optical connection relationship to at least first and second of said optical switch matrix optical outputs, respectively, thereby being at least first and second predetermined fixed optical connections effecting at least first and second of said optical switch matrix switch states, said first optical input of said optical switch matrix being directly optically connected to a first optical output of the terminal equipment and intended to transport optical signals to said first optical output of said optical switch matrix in a first direction of transmission, and said second optical input of said optical switch matrix being directly optically connected to a second optical output of the terminal equipment and intended to transport optical signals to said second optical output of said optical switch matrix in a second direction of transmission opposite to said first direction of transmission; and a plurality of controllable optical switch units being responsive to switch control signals for controllably optically connecting prescribed ones of said inputs to prescribed ones of said outputs and being limited to switching of only a second number of said optical switching states fewer in number than said first predetermined number of optical switching states.

2. The invention as defined in claim 1 wherein said terminal equipment further includes at least a first one-to-two optical coupler and a second one-to-two optical coupler, wherein a first optical signal is intended to be dual fed to two predetermined ones of said optical switch matrix optical inputs by a first of said optical couplers, one of said optical switch matrix predetermined optical inputs being directly optically connected in said predetermined fixed one-to-one optical connection relationship via a first one of said first and second optical switch matrix predetermined fixed optical switch states to one of said predetermined optical outputs of said optical switch matrix, and wherein a second optical signal is intended to be dual fed to two predetermined others of said optical switch matrix optical inputs by a second of said optical couplers, one of said optical switch matrix predetermined others of optical inputs being directly optically connected in said predetermined fixed one-to-one optical connection relationship via the other of said first and second optical switch matrix predetermined fixed optical switch states to another one of said predetermined optical outputs of said optical switch matrix.

3. The invention as defined in claim 2 wherein said optical inputs of said optical switch matrix not directly connected in said predetermined fixed one-to-one optical connection relationship to an optical output of said optical switch matrix are optically connected to the optical inputs of a first predetermined number of said optical switch units in a predetermined configuration, prescribed optical outputs from said first predetermined number of optical switch units being optically connected in a predetermined configuration to the optical inputs of a second predetermined number of said optical switch units, an optical output of a first predetermined one of said first predetermined number of optical switch units being optically connected to a third predetermined output of said optical switch matrix, an optical output of a second predetermined one of said first predetermined number of optical switch units being optically connected to a fourth predetermined output of said optical switch matrix, and optical outputs of said second predetermined number of optical switch units being optically connected in a predetermined configuration and on a one-to-one basis to optical outputs of said optical switch matrix not directly connected in said predetermined fixed one-to-one optical connection relationship to an optical input of said optical switch matrix.

4. The invention as defined in claim 3 wherein said optical switch matrix includes eight (8) optical inputs and six (6) optical outputs, and wherein only six (6) of said optical inputs are controllably optically connected via said optical switch units to four (4) of said optical outputs of said optical switch matrix and two (2) of said optical switch matrix optical inputs and two (2) of said optical matrix optical outputs are optically connected in said first and second predetermined fixed one-to-one optical connection relationships.

5. The invention as defined in claim 4 wherein said second number of optical switching states of said six (6) optical inputs to said four (4) optical outputs is eight (8).

6. The invention as defined in claim 3 wherein said optical switch units of said first predetermined number of optical switch units include a first plurality optical switch units each having two optical inputs and two optical outputs and said optical switch units of said second predetermined number of optical switch units include a second plurality of optical switch units each having two optical inputs and one optical output.

7. The invention as defined in claim 6 wherein said first predetermined number is three (3) and said second predetermined number is two (2).

8. An optical node for use in an optical transmission system including a plurality of optical nodes connected by at least two optical transmission media in an optical transmission ring configuration, the at least two optical transmission media providing active optical service transmission capacity and standby optical protection transmission capacity, the node comprising:

terminal equipment including a plurality of optical inputs and a plurality of optical outputs;

a controllable optical switch matrix having a plurality of optical inputs to which incoming optical signals are intended to be supplied, a plurality of optical outputs to which outgoing optical signals are intended to be supplied, a first predetermined number of possible optical switching states between said optical switch matrix optical inputs and optical outputs, at least first and second of said optical switch matrix optical inputs being directly optically connected in a predetermined fixed one-to-one optical connection relationship to at least first and second of said optical switch matrix optical outputs, respectively, thereby being at least first and second predetermined fixed optical connections effecting at least first and second of said optical switch matrix switch states, said first optical input of said optical switch matrix being directly optically connected to a first optical output of the terminal equipment and intended to transport optical signals to said first optical output of said optical switch matrix in a first direction of transmission, and said second optical input of said optical switch matrix being directly optically connected to a second optical output of the terminal equipment and intended to transport optical signals to said second optical output of said optical switch matrix in a second direction of transmission opposite to said first direction of transmission, and a plurality of controllable optical switch units being responsive to control signals for controllably switching optical signals between the optical service capacity and optical protection capacity of said at least two optical transmission media and being limited to optically switching of only a second number of said optical switching states fewer in number than said first predetermined number of optical switching states;

an optical detector for detecting failure of any of said at least two optical transmission media and for generating an indication of such failure; and a controller responsive to an indication of an optical transmission media failure from said optical detector for generating said control signals to be supplied to said optical switch units in said optical switch matrix.

9. The invention as defined in claim 8 wherein said terminal equipment further includes at least a first one-to-two optical coupler and a second one-to-two optical coupler, wherein a first optical signal is intended to be dual fed to two predetermined ones of said optical switch matrix optical inputs by a first of said optical couplers, one of said optical switch matrix predetermined optical inputs being directly optically connected in said predetermined fixed one-to-one optical connection relationship via a first one of said first and second optical switch matrix predetermined fixed optical switch states to one of said predetermined optical outputs of said optical switch matrix, and wherein a second optical signal is intended to be dual fed to two predetermined others of said optical switch matrix optical inputs by a second of said optical couplers, one of said predetermined others of said optical switch matrix optical inputs being directly optically connected in said predetermined fixed one-to-one optical connection relationship via the other of said first and second optical switch matrix predetermined fixed optical switch states to another one of said predetermined optical outputs of said optical switch matrix.

10. The invention as defined in claim 9 wherein said optical inputs of said optical switch matrix not directly connected in said predetermined fixed one-to-one optical connection relationship to an optical output of said optical switch matrix are optically connected to the optical inputs of a first predetermined number of optical switch units in a predetermined configuration. prescribed optical outputs from said first predetermined number of optical switch units being optically connected in a predetermined configuration to the optical inputs of a second predetermined number of said optical switch units, an optical output of a first predetermined one of said first predetermined number of optical switch units being optically connected to a third predetermined optical output of said optical switch matrix, an optical output of a second predetermined one of said first predetermined number of optical switch units being optically connected to a fourth predetermined optical output of said optical switch matrix, and optical outputs of said second predetermined number of optical switch units being optically connected in a predetermined configuration and on a one-to-one basis to optical outputs of said optical switch matrix not directly connected in said predetermined fixed one-to-one optical connection relationship to an optical input of said optical switch matrix.

11. The invention as defined in claim 10 wherein said optical switch matrix includes eight (8) optical inputs and six (6) optical outputs and wherein only six (6) of said optical inputs are controllably optically connected via said optical switch units to four (4) of said optical outputs of said optical switch matrix and two (2) of said optical switch matrix optical inputs and two (2) of said optical matrix optical outputs are optically connected in said first and second predetermined fixed one-to-one optical connection relationships.

12. The invention as defined in claim 11 wherein said second number of switching states of said six (6) optical inputs to said four (4) optical outputs is eight (8).

13. The invention as defined in claim 11 wherein said optical switch units of said first predetermined number of optical switch units include a first plurality optical switch units each having two optical inputs and two optical outputs and said optical switch units of said second predetermined number of optical switch units include a second plurality of optical switch units each having two optical inputs and one optical output.

14. The invention as defined in claim 13 wherein said first predetermined number of optical switch units is three (3) and said second predetermined number of optical switch units is two (2).

15. The invention as defined in claim 8 wherein first and second of said optical outputs and first and second of said optical inputs of said optical switch matrix are intended to be interfaced to at least first and second optical transmission media, respectively, in a first direction of transmission, and third and fourth of said optical outputs and third and fourth of said optical inputs of said optical switch matrix are intended to be interfaced to at least first and second optical transmission media, respectively, in a second direction of transmission.

16. The invention as defined in claim 15 wherein each of said at least first and second optical transmission media is a bi-directional optical transmission media.

17. The invention as defined in claim 16 wherein each of said bi-directional transmission media in both directions of transmission is an optical fiber.

18. The invention as defined in claim 8 wherein a first of said optical outputs, a second of said optical outputs, a first of said optical inputs and a second of said optical inputs of said optical switch matrix are intended to be interfaced to first, second, third and fourth optical transmission media, respectively, in a first direction of transmission, and a third of said optical outputs, a fourth of said optical outputs, a third of said optical inputs and fourth of said optical inputs of said optical switch matrix are intended to be interfaced to at first, second, third and fourth optical transmission media, respectively, in a second direction of transmission.

19. The invention as defined in claim 18 wherein each of said first, second, third and fourth optical transmission media in both directions of transmission is an optical fiber.

20. An optical transmission system including a plurality of optical nodes connected in a ring configuration by at least two optical transmission media in a first direction of transmission and at least two optical transmission media in a second direction of transmission, each of the optical nodes comprising:

terminal equipment including a plurality of optical inputs and a plurality of optical outputs;

a controllable optical switch matrix having a plurality of optical inputs to which incoming optical signals are intended to be supplied, a plurality of optical outputs to which outgoing optical signals are intended to be supplied, a first predetermined number of possible optical switching states between said optical switch matrix optical inputs and optical outputs, at least first and second of said optical switch matrix optical inputs being directly optically connected in a predetermined fixed one-to-one optical connection relationship to at least first and second of said optical switch matrix optical outputs, respectively, thereby being at least first and second predetermined fixed optical connections effecting at least first and second of said optical switch matrix switch states, said first optical input of said optical switch matrix being directly optically connected to a first optical output of the terminal equipment and intended to transport optical signals to said first optical output of said optical switch matrix in a first direction of transmission, and said second optical input of said optical switch matrix being directly optically connected to a second optical output of the terminal equipment and intended to transport optical signals to said second optical output of said optical switch matrix in a second direction of transmission opposite to said first direction of transmission, and a plurality of controllable optical switch units being responsive to control signals for controllably switching optical signals between the optical service capacity and optical protection capacity of said at least two optical transmission media and being limited to optically switching of only a second number of said optical switching states fewer in number than said first predetermined number of optical switching states;

an optical detector for detecting failure of any of said at least two optical transmission media and for generating an indication of such failure; and a controller responsive to an indication of an optical transmission media failure from said optical detector for generating said control signals to be supplied to said optical switch units in said optical switch matrix.

21. The invention as defined in claim 20 wherein first and second of said optical outputs and first and second of said optical inputs of said optical switch matrix are intended to be interfaced to at least first and second optical transmission media, respectively, in a first direction of transmission, and third and fourth of said optical outputs and third and fourth of said optical inputs of said optical switch matrix are intended to be interfaced to at least first and second optical transmission media, respectively, in a second direction of transmission.

22. The invention as defined in claim 21 wherein each of said at least first and second optical transmission media is a bi-directional optical transmission media.

23. The invention as defined in claim 22 wherein each of said bi-direction transmission media in both directions of transmission is an optical fiber.

24. The invention as defined in claim 20 wherein a first of said optical outputs, a second of said optical outputs, a first of said optical inputs and a second of said optical inputs of said optical switch matrix are intended to be interfaced to first, second, third and fourth optical transmission media, respectively, in a first direction of transmission, and a third of said optical outputs, a fourth of said optical outputs, a third of said optical inputs and fourth of said optical inputs of said optical switch matrix are intended to be interfaced to at first, second, third and fourth optical transmission media, respectively, in interfaced to at first, second, third and fourth optical transmission media, respectively, in a second direction of transmission.

25. The invention as defined in claim 24 wherein each of said first, second, third and fourth optical transmission media in both directions of transmission is an optical fiber.

26. The invention as defined in claim 20 wherein said terminal equipment further includes at least a first one-to-two optical coupler and a second once-to-two optical coupler, wherein a first optical signal is intended to be dual fed to two predetermined ones of said optical switch matrix optical inputs by a first of said optical couplers one of said optical switch matrix predetermined optical inputs being directly optically connected in said predetermined fixed one-to-one optical connection relationship via a first one of said first and second optical switch matrix predetermined fixed optical switch states to one of said predetermined optical outputs of said optical switch matrix, and wherein a second optical signal is intended to be dual fed to two predetermined others of said optical switch matrix optical inputs by a second of said optical couplers, one of said predetermined others of said optical switch matrix optical inputs being directly optically connected in said predetermined fixed one-to-one optical connection relationship via the other of said first and second optical switch matrix predetermined fixed optical switch states to another one of said predetermined optical outputs of said optical switch matrix.

27. The invention as defined in claim 26 wherein said optical inputs of said optical switch matrix not directly connected in said predetermined fixed one-to-one optical connection relationship to an optical output of said optical switch matrix are optically connected to the optical inputs of a first predetermined number of said optical switch units in a predetermined configuration, prescribed optical outputs from said first predetermined number of optical switch units being optically connected in a predetermined configuration to the optical inputs of a second predetermined number of said optical switch units, an optical output of a first predetermined one of said first predetermined number of optical switch units being optically connected to a third predetermined optical output of said optical switch matrix, an optical output of a second predetermined one of said first predetermined number of optical switch units being optically connected to a fourth predetermined optical output of said optical switch matrix, and optical outputs of said second predetermined number of optical switch units being optically connected in a predetermined configuration and on a one-to-one basis to optical outputs of said optical switch matrix not directly connected in said predetermined fixed one-to-one optical connection relationship to an optical input of said optical switch matrix.

28. The invention as defined in claim 27 wherein said optical switch matrix includes eight (8) optical inputs and six (6) optical outputs and wherein only six (6) of said optical inputs are controllably optically connected via said optical switch units to four (4) of said optical outputs of said optical switch matrix and two (2) of said optical switch matrix optical inputs and two (2) of said optical matrix optical outputs are optically connected in said first and second predetermined fixed one-to-one optical connection relationships.

29. The invention as defined in claim 28 wherein said second number of switching states of said six (6) optical inputs to said four (4) optical outputs is eight (8).

30. The invention as defined in claim 28 wherein said optical switch units of said first predetermined number of optical switch units include a first plurality of optical switch units each having two optical inputs and two optical outputs and said optical switch units of said second predetermined number of optical switch units include a second plurality of optical switch units each having two optical inputs and one optical output.

31. The invention as defined in claim 30 wherein said first predetermined number of optical switch units is three (3) and said second predetermined number of optical switch units is two (2).

* * * * *